No. 761,316.

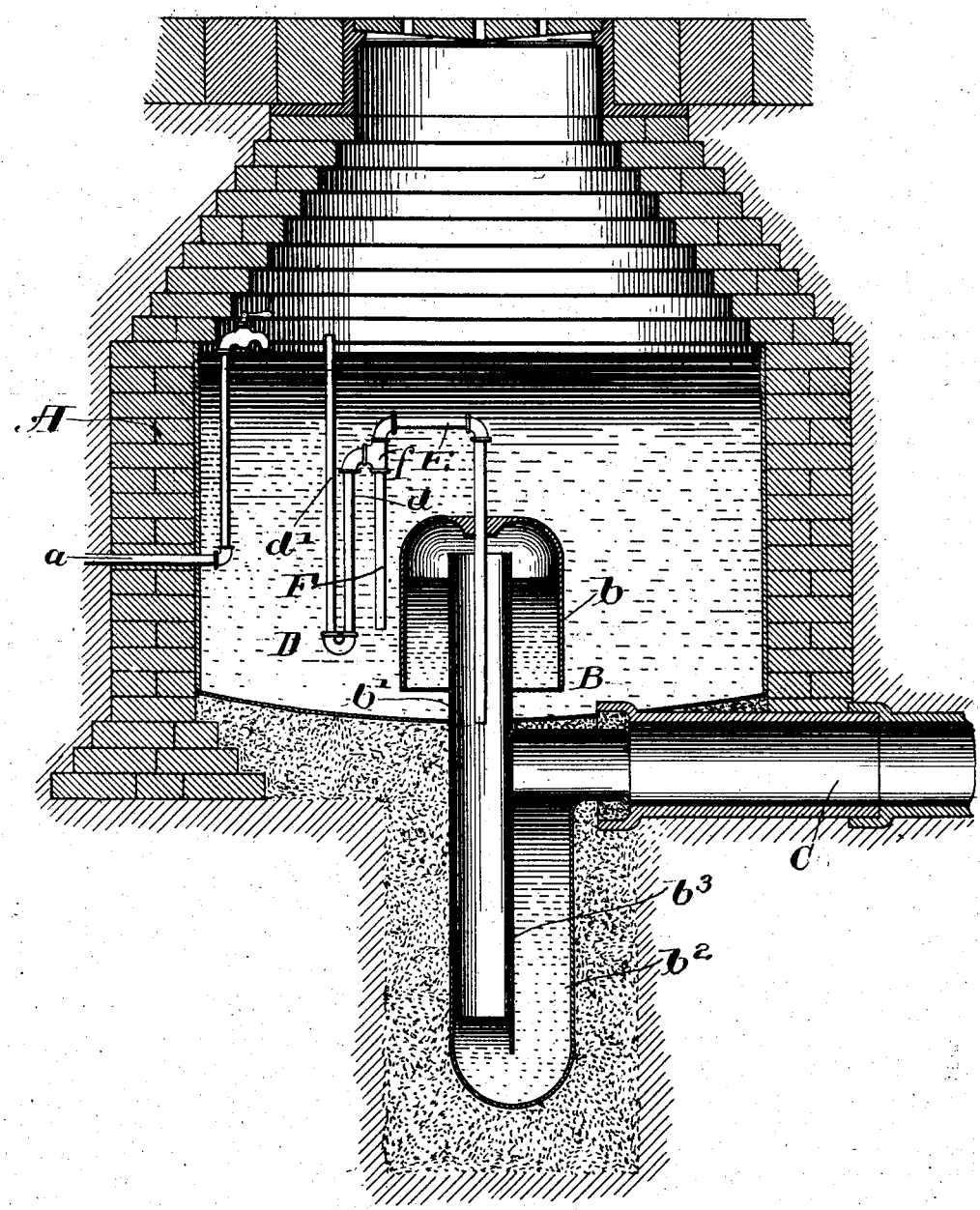

Patented May 31, 1904.

UNITED STATES PATENT OFFICE.

SIDNEY W. MILLER, OF CHICAGO, ILLINOIS.

DOUBLE-TRAP SIPHON.

SPECIFICATION forming part of Letters Patent No. 761,316, dated May 31, 1904.

Application filed September 8, 1903. Serial No. 172,208. (No model.)

*To all whom it may concern:*

Be it known that I, SIDNEY W. MILLER, of Chicago, in the county of Cook and State of Illinois, have invented certain new and useful Improvements in Double-Trap Siphons; and I do hereby declare that the following is a full, clear, and exact description thereof, reference being had to the accompanying drawings, and to the letters of reference marked thereon, which form a part of this specification.

This invention relates to improvements in automatic siphons for emptying liquid-containing tanks, and refers more specifically to that class of siphons known as "double-trap" siphons, wherein the siphon is provided in addition to a main or principal trap connected with the outlet-limb thereof with an auxiliary trap having a less depth of seal than that of the main trap and designed to be forced or blown off to bring the siphon into operation before there is sufficient pressure in the siphon to force the main trap.

The apparatus herein disclosed is generally like the double-trap siphon shown in my prior United States Letters Patent, No. 727,990, issued May 12, 1903, wherein the auxiliary siphon is so located as to be accessible for adjustment or repair without disturbing the setting of the main siphon. In the construction shown in said prior patent the auxiliary trap is located outside of the chamber which the siphon is designed to empty, while in the construction herein shown said auxiliary trap is located in the same chamber, and I am thereby enabled to apply said new structure in places where a separate chamber is not at hand wherein to locate the auxiliary siphon and where it is unnecessary to make provision for such auxiliary chamber. In the form of auxiliary trap herein shown, however, the outlet-limb thereof may be made longer than the inlet-limb in order to extend above the liquid-level of the tank when the latter is filled, so that in this construction the length of the outlet-limb of the trap does not limit or control the maximum depth of seal of the trap. The auxiliary trap is located with its effective part outside of the siphon in order to permit the trap to be readily applied to the siphon or detached therefrom without the necessity of de-ranging or interfering with the siphon-setting. Such location of the trap also enables the same to be adjusted without interfering with the siphon in a manner to bring the siphon into operation at different liquid-levels in the tank containing the siphon, as will hereinafter more fully appear.

The figure of the drawing illustrates a vertical section taken through a tank and a deep-seal siphon for emptying the same, showing my improvements applied thereto.

As shown in the drawing, A designates a tank which in the instance shown is a sewer flush-tank and is provided with a valved filling-pipe $a$. B designates as a whole a deep-trap siphon through which said tank is emptied. Said siphon consists of a shorter or intake limb $b$, a longer or outlet limb $b'$, and a deep trap $b^2$, which may be of any suitable form and the shorter or outlet limb of which discharges into a pipe C, which leads to a sewer or other suitable place for the disposal of the liquid. In the instance shown the shorter or intake limb of the siphon consists of an inverted bell which is placed over the intaking end of the outlet-limb of the siphon in a familiar manner. The form of the trap of the siphon may be like that shown in my prior patent above referred to; but, as herein shown, it consists of a single hollow casting provided with a vertical partition $b^3$, extending almost to the bottom of the casting and dividing the trap into a receiving and discharge limb.

Referring now to the auxiliary trap, which attachment constitutes the present invention, these parts are made as follows: D designates as a whole said trap, which communicates with the interior of the siphon by means of a connecting-pipe E, which is shown as bent downwardly at its end remote from the trap D and enters the siphon through the top of the intake-limb or bell $b$ and extends into the outlet-limb of the siphon a distance slightly below the level of the lower margin of said bell. Said connecting-pipe E may, however, communicate with the siphon otherwise than herein shown. The upper part of the connecting-pipe E may or may not be located below the maximum liquid-level of the tank, as desired. Said trap is located with its effective sealing part wholly within the tank A and consists of a shorter or intake-limb $d$, which communicates with the pipe E and extends downwardly therefrom, and a longer or outlet limb $d'$, which is attached at its lower end to the lower end of the intake-limb by means of a curved fitting in the manner shown. The outlet-limb of the auxiliary trap is herein shown as made of a length to extend at its upper end above the maximum liquid-level in the tank. The parts of the auxiliary trap are so proportioned relatively to the trap of the main siphon that the effective sealing column of liquid therein is shorter than the corresponding column of liquid in the deep-seal trap, whereby the pressure existing in the siphon during the filling of the tank acts to force the seal of said auxiliary trap before said pressure is sufficient to force the seal in the deep-seal trap, it being the intent that said siphon shall always be started by the forcing of the auxiliary trap and never by the forcing of the deep-seal trap.

The auxiliary trap is automatically refilled after it has been blown to release the pressure in the siphon, and during the first part of the emptying operation in the same manner as the auxiliary trap shown in my said prior patent is refilled. The refilling means consists of a pipe F, which is connected with the intake-limb of the auxiliary trap and depends therefrom to a level somewhat above the level of the connection between the lower ends of the limbs of the auxiliary trap. Said refilling-pipe, the connecting-pipe E, and the intake-limb of the auxiliary trap are connected by a T-joint $f$ or other suitable fitting. After the seal of the auxiliary trap is forced or blown and when the siphon is in operation the head of the liquid in the tank acts to force liquid up through the refilling-pipe F into the auxiliary trap and refills said auxiliary trap. In the form of apparatus shown a portion of the water forced upwardly through said refilling-pipe F is directed through the connecting-pipe E to the siphon; but if said connecting-pipe be located partly above the liquid-level no part of the liquid passing upwardly through the pipe F will find its way to the siphon. In the continued fall of the liquid-level in the tank A some of the liquid is drawn from the auxiliary trap by siphonic action from the pipe $d$ through the pipe F; but such siphonic action ceases as soon as the liquid-level falls below the lower or intake end of the pipe F. When the auxiliary trap is refilled in the manner stated, the liquid will rise in the outlet-limb $d'$ thereof to approximately the level of the liquid in the tank, and as the tank-level falls the level in said pipe $d'$ falls with the same. It will be seen, therefore, that at the time the lower end of the refilling-pipe F is uncovered by the fall of liquid in the tank there is a column of liquid in the auxiliary trap of a length equal to the length of the inlet-limb $d$ of said auxiliary trap, (said inlet-limb being entirely filled,) plus the length of the liquid-column remaining in the lower end of the outlet-limb $d'$ of said auxiliary trap, the length of which latter will be equal to the distance between the levels of the lower ends of the refilling-pipe F and outlet-limb $d'$ of the auxiliary trap. To this column will be added the liquid contained in the horizontal parts of the trap connecting, respectively, the lower ends of the limbs of the trap and the upper end of the inlet-limb of the trap and the refilling-pipe. As soon as siphonic action has ceased in the auxiliary trap the liquid in the several parts of said trap settles back into the lower end of the trap, the liquid finding a common level in the two limbs of the trap. In the next filling of the tank the pressure produced in the siphon after the lower end of the refilling-pipe is sealed acts to drive the liquid from the inlet to the outlet limb of the trap, and the length of said column after it has been transferred to the outlet-limb of the trap constitutes the effective sealing column, which, as before stated, is of less length than the sealing column of the main trap. The seal of the auxiliary trap is therefore forced before the seal of the main trap and starts the siphon into action. It will be observed that so long as the auxiliary trap is contained wholly within the tank A the outlet-limb of said trap will need to be made sufficiently long to extend above the level of liquid required to furnish a head to force said auxiliary trap to prevent the upper end of said outlet-limb being submerged by the liquid, though in some instances the open end of said outlet-limb may extend laterally out of the tank below the maximum liquid-level thereof.

The auxiliary trap and the refilling and connecting pipes mentioned are of such form and so arranged that they may be readily applied as an attachment to any type of deep-seal siphon and may be readily applied to a siphon which is already set or installed. The said parts, therefore, which constitute a unitary structure, are hereinafter claimed as an attachment, as well as claimed in combination with the siphon.

I claim as my invention—

1. The combination with a tank and a siphon for emptying the same having a trapped discharge-limb, of an auxiliary trap for said siphon located in said tank and outside of the siphon and having a less depth of effective or working seal than that of the main trap and means for refilling the auxiliary trap from the liquid in the tank before it has passed into the siphon.

2. The combination with a tank and a siphon for emptying the same having a trapped discharge-limb, of an auxiliary trap for said siphon said trap being located outside of the siphon and wholly within the tank and accessible for removal or adjustment without disturbing the siphon-setting, and means for refilling said trap.

3. The combination with a tank and a siphon for emptying the same having a trapped discharge-limb, of an auxiliary trap comprising the parts $d$ $d'$ communicating with the interior of the siphon as by the pipe E, the effective parts of said trap being located within said tank and outside of the siphon.

4. The combination with a siphon having a trapped discharge-limb, of an auxiliary trap for said siphon located outside of the siphon and within the tank comprising a short receiving-limb and a longer discharge-limb, the upper end of which latter is located above the maximum liquid-level required to force the auxiliary trap, a pipe connecting said receiving-limb with the siphon, and means for refilling said auxiliary trap.

5. An attachment for deep-seal siphons comprising an auxiliary trap having a receiving-limb and a discharge-limb, the latter being made of such length as to extend above a liquid-level required to force said auxiliary trap, a pipe connected with said auxiliary trap and constructed to be inserted into a deep-seal siphon, and a refilling-pipe communicating with and depending from said connecting-pipe.

In testimony that I claim the foregoing as my invention I affix my signature, in presence of two witnesses, this 31st day of August, A. D. 1903.

SIDNEY W. MILLER.

Witnesses:
WILLIAM L. HALL,
GERTRUDE BRYCE.